United States Patent
Schwegler et al.

(10) Patent No.: US 12,415,512 B2
(45) Date of Patent: Sep. 16, 2025

(54) VEHICLE LATERAL COMPENSATION FOR PATH DEVIATION DUE TO ENVIRONMENTAL FORCES

(71) Applicants: Steering Solutions IP Holding Corporation, Auburn Hills, MI (US); Continental Automotive Systems, Inc., Auburn Hills, MI (US)

(72) Inventors: Jason Schwegler, Grand Blanc, MI (US); Michael Cottrell, White Lake, MI (US); Nicholas Mawhinney, Fenton, MI (US)

(73) Assignees: Steering Solutions IP Holding Corporation, Auburn Hills, MI (US); Continental Automotive Systems Inc., Auburn Hills, MI (US)

( * ) Notice: Subject to any disclaimer, the term of this patent is extended or adjusted under 35 U.S.C. 154(b) by 251 days.

(21) Appl. No.: 18/113,865

(22) Filed: Feb. 24, 2023

(65) Prior Publication Data

US 2024/0286608 A1    Aug. 29, 2024

(51) Int. Cl.
*B60W 30/095* (2012.01)
*B60W 10/04* (2006.01)
(Continued)

(52) U.S. Cl.
CPC ........ *B60W 30/0956* (2013.01); *B60W 10/04* (2013.01); *B60W 10/18* (2013.01);
(Continued)

(58) Field of Classification Search
CPC .. B60W 30/0956; B60W 10/04; B60W 10/18; B60W 10/20; B60W 50/0097; B60W 2552/20; B60W 2555/20; B60W 2050/0031; B60W 2710/18; B60W 2710/20

See application file for complete search history.

(56) References Cited

U.S. PATENT DOCUMENTS

| | | |
|---|---|---|
| 7,102,496 B1 | 9/2006 | Ernst, Jr. et al. |
| 8,170,739 B2 | 5/2012 | Lee |

(Continued)

FOREIGN PATENT DOCUMENTS

| | | |
|---|---|---|
| DE | 102008041248 A1 | 6/2009 |
| DE | 102010029245 A | 12/2011 |

(Continued)

OTHER PUBLICATIONS

Fitrt Yakub ; Autonomous car in path following control under side wind effect by laguerre function; 7 Pages (61-66) https://www.researchgate.net/profile/Fitri-Yakub/publication/260762114_Autonomous_car_in_path_following_control_under_side_wind_effect_by_laguerre_function/links/02e7e5322aa9c57109000000/Autonomous-car-in-path-following-control-under-.

(Continued)

*Primary Examiner* — Andrew J Cromer
(74) *Attorney, Agent, or Firm* — Ingrassia Fisher & Lorenz, LLP

(57) ABSTRACT

A number of variations are disclosed including a system and method including modifying motion controller actuator commands in real-time based on calculated offset induced when a vehicle exceeds acceleration and rotational limits of a vehicle when experiencing crosswind or other environmental forces.

15 Claims, 2 Drawing Sheets

(51) Int. Cl.
*B60W 10/18* (2012.01)
*B60W 10/20* (2006.01)
*B60W 50/00* (2006.01)

(52) U.S. Cl.
CPC ........ *B60W 10/20* (2013.01); *B60W 50/0097* (2013.01); *B60W 2050/0031* (2013.01); *B60W 2552/20* (2020.02); *B60W 2555/20* (2020.02); *B60W 2710/18* (2013.01); *B60W 2710/20* (2013.01)

(56) References Cited

U.S. PATENT DOCUMENTS

| | | | |
|---|---|---|---|
| 8,190,330 | B2 | 5/2012 | Lee |
| 8,364,370 | B2 | 1/2013 | Yonezawa et al. |
| 8,428,843 | B2 | 4/2013 | Lee et al. |
| 8,437,890 | B2 | 5/2013 | Anderson et al. |
| 8,818,606 | B2 | 8/2014 | Lee et al. |
| 9,168,924 | B2 | 10/2015 | Lee et al. |
| 9,428,187 | B2 | 8/2016 | Lee |
| 10,046,743 | B2 | 8/2018 | Jonasson et al. |
| 10,046,749 | B2 | 8/2018 | Jonasson et al. |
| 10,725,470 | B2 | 7/2020 | Mahabadi et al. |
| 10,994,729 | B2 | 5/2021 | Berntorp et al. |
| 2008/0015754 | A1* | 1/2008 | Hac ........................ B62D 6/003 701/1 |
| 2016/0325721 | A1* | 11/2016 | Jonasson ................. B60T 8/171 |
| 2017/0183035 | A1 | 6/2017 | Patana |

FOREIGN PATENT DOCUMENTS

| | | |
|---|---|---|
| DE | 102018203617 A1 | 9/2019 |
| DE | 102018206018 A1 | 10/2019 |
| DE | 102018125250 A1 | 4/2020 |
| DE | 102018222783 A1 | 6/2020 |
| WO | 2021043925 A1 | 3/2021 |

OTHER PUBLICATIONS

Yang et al. Intelligent Vehicle Lateral Control Method Based on Feedforward + Predictive LQR Algorithm ;(21 Pages) https://www.mdpi.com/2076-0825/10/9/228/pdf.

* cited by examiner

VEHICLE LATERAL COMPENSATION FOR PATH DEVIATION DUE TO ENVIRONMENTAL FORCES

TECHNICAL FIELD

The field to which the disclosure generally relates to includes a method or system involving driver assisted or autonomous vehicle driving method or system.

BACKGROUND

Vehicles typically include advanced driver assist systems including electric power steering systems or controllers implementing driver assist or autonomous driving capabilities.

SUMMARY OF ILLUSTRATIVE VARIATIONS

A number of variations may include a system and method for modifying motion controller actuator commands in real-time based on calculated offset induced by exceeding acceleration and rotational limits of a vehicle when experiencing crosswind or other environmental forces.

Other illustrative variations within the scope of the invention will become apparent from the detailed description provided hereinafter. It should be understood that the detailed description and specific examples, while disclosing variations of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

Figure 1:
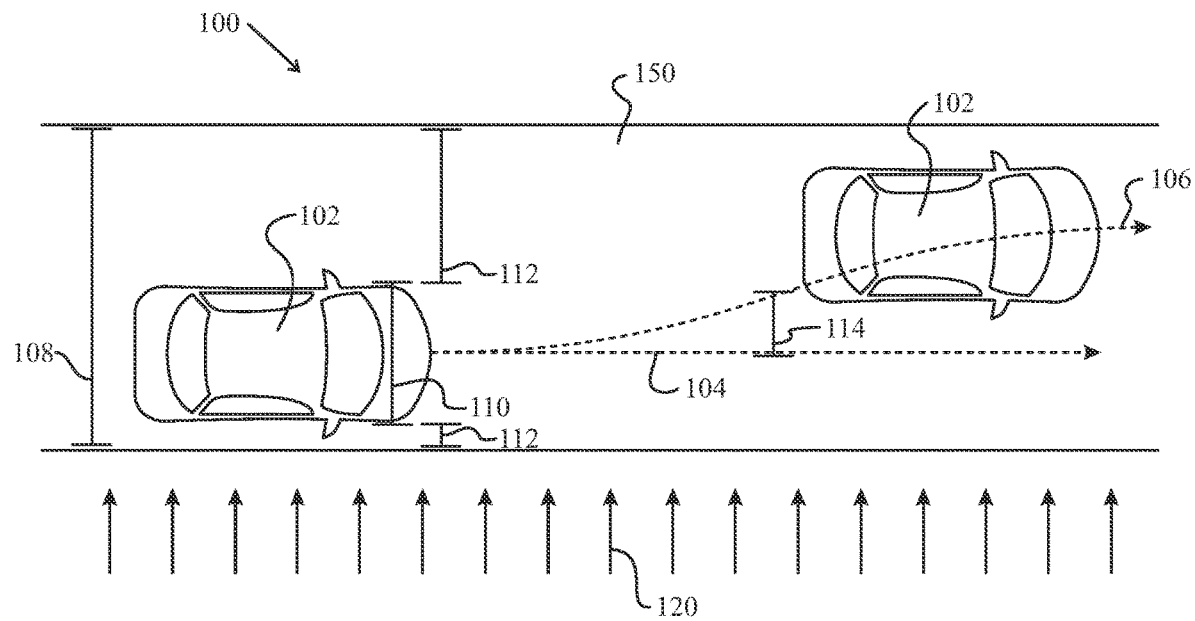
FIG. 1 depicts an illustrative variation of a vehicle implementing lateral compensation for path deviation due to environmental forces.

The drawings are not necessarily to scale, and certain features and certain views of the drawings may be shown exaggerated in scale or in schematic in the interest of clarity and conciseness and should not be considered limiting.

DETAILED DESCRIPTION OF ILLUSTRATIVE VARIATIONS

The following description of the variations is merely illustrative in nature and is in no way intended to limit the scope of the invention, its application, or uses.

Vehicles may be configured for autonomous driving functionality such as, but not limited to, driver assistance, partial driving automation, conditional driving automation, high driving automation, full driving automation, lane keep assist, park assist, adaptive cruise control, obstacle avoidance, and others.

A vehicle's motion control system may also be autonomous in that the vehicle may propel, steer, or brake itself to approach a predetermined location that has been communicated to it with or without interaction with a driver. The vehicle's advanced driver assist system may have an obstacle avoidance system that allows the vehicle to sense or detect objects in its path and avoid them. The vehicle's advanced driver assist system may have a motion planner or trajectory planning system that allows the vehicle to plan vehicle path.

Degrees of autonomous driving functionality may be achieved, at least, vehicle via sensors configured to capture, observe, measure, or calculate environmental data or vehicle data in conjunction with motion planning or trajectory planning. Vehicle sensors may include sensors associated with cargo or passenger vehicles such as, park assist sensors, blind spot detection sensors, surround view sensors, collision warning sensors, traffic sign or signal recognition sensors, emergency brake, pedestrian detection, collision avoidance sensors, or cross traffic sensors. Vehicle sensors may include radar, lidar, cameras, global positions system (GPS), global navigation satellite systems (GNSS), environmental sensors, or the like. Vehicle sensors may perform a variety of functions with respect to detecting, reading, recognizing, or interpreting data associated with local surroundings, operating environment, and vehicle data.

During operation of a vehicle implementing an autonomous driving system such as lane-keeping functionality, a vehicle may drive along a relatively flat and straight stretch of road. The vehicle may implement a lateral compensation system as described herein. During operation, the system may include a motion control that may receive a trajectory path from a trajectory planner. Based on the trajectory path, the motion planner may calculate steering, propulsion, or braking actuation outputs required to achieve the trajectory path, including intermediate actuations, and may determine a physical model for prediction of the vehicle behavior given the planned steering, propulsion, or braking actuations. The model may be used to generate trajectory boundaries of expected accelerations and rotations of the vehicle body at a given interval in the motion plan.

To achieve a desired trajectory, a motion controller may calculate a set of steering, propulsion, or braking actuation commands to follow the desired path over the next few seconds. At the same time, the motion controller may predict a set of acceleration and rotational limits the vehicle will stay within at various points during an interval of time. As the measured dynamics of the vehicle reach or exceed acceleration and rotational limits, the motion controller may calculate an offset induced by the exceeded limit and apply actuation adjustments to restore the position or pose to the desired trajectory. Alternatively, if the vehicles reaches or exceeds acceleration and rotational limits, the offset between the exceeded limits and the actual measured acceleration and rotational dynamics may be used by the motion planner to determine a best actuation approach to bring the vehicle dynamics back within allowed limits.

A traditional lane keep assist functionality may only using the steering actuator to maintain lane position as vehicle path deviates. However, environmental factors such as crosswind, road slip, road geometry, or others may tangentially influence autonomous driving systems that would otherwise normally be managed by the driver with their hands on the wheel. As a non-limiting example, an autonomous driving system may readily account for lane curves, turns, inclines, or declines which are easily predicted by a forward-looking sensor system identifying road limits. However, autonomous driving systems may not be readily able to rapidly adjust for unexpected and spontaneous external forces such as crosswinds or sudden change in road geometry. According to some embodiments, to keep all actuators within desired operational readiness, the choice of actuators used to maintain the requested trajectory may be constantly evaluated and adjusted without the need for reliance on vehicle sensors configured to capture, observe, measure, or calculate environmental data or vehicle data in conjunction with motion planning or trajectory planning. As a non-limiting example, an autonomous driving system may adjust or blend steering, braking, or propulsion actuations based on the external forces building up on the chassis of the vehicle due to road geometry or environmental factors prior to onboard vehicle visual sensors detecting a problem because the car began to move off the line of the intended path. The disclosed system or method may also monitor current and past vehicle dynamics to see if a standard offset to actuator commands is necessary regardless of the path requests from a lane keep system.

As the vehicle travels down the planned trajectory path and the actuations are performed, a physical model deviation observer may crosscheck the vehicle dynamic measurements with the trajectory boundaries that the vehicle is expected to stay within on the given motion plan. If the observations reach or begin to exceed predetermined limits, then the motion planner may adjustment the motion plan with remaining capability of the actuators to return the dynamic measurements to a more neutral position i.e. not near or exceeding predetermined limits within the boundaries. The motion planner may also limit the motion plan while notifying the trajectory planner of the degree that the motion planner is adjusting the requested trajectory. Alternatively, or simultaneously, the motion planner may notify the trajectory planner of the increased actuator capability consumed by the motion planner to achieve the desired path.

Referring to FIG. 1, a vehicle 102 operating in an operating environment 150, such as a roadway, may experience external forces 120 such as crosswind or forces generated by sloped roadways which interfere with autonomous driving functionality. The vehicle 102 may travel along a desired path 104 as determined by autonomous driving functionality within, for example, a roadway lane having a lane width 108. A lateral compensation system 100 functioning to adjust autonomous driving actuator commands during operation may receive autonomous driving data from any number of onboard vehicle sensors. The system 100 may monitor lane width 108 and vehicle width 110 relative to an allowed lateral travel distance 112 on either side of the vehicle. Allowed lateral travel distance 112 may be the distance between the side of the vehicle 102 and the edge of the lane 150 allowed before the vehicle 102 leaves the lane 150.

External forces 120 may apply undesired lateral forces on the vehicle, resulting in the vehicle shifting laterally into an actual path 106 and a resultant path difference 114.

Figure 2:
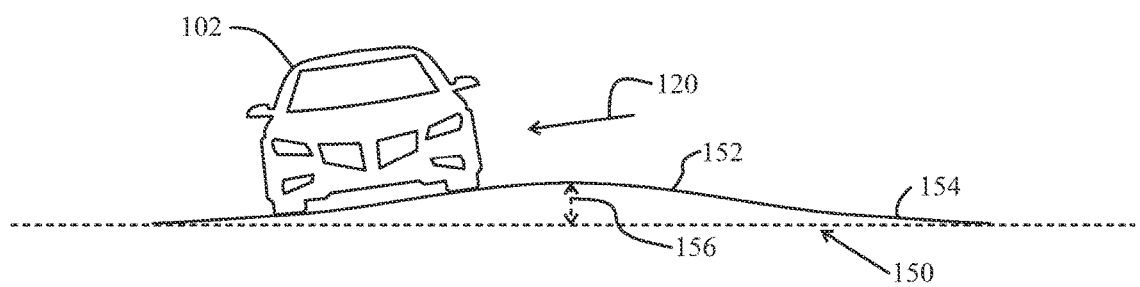
FIG. 2 depicts an illustrative variation of a vehicle implementing lateral compensation for path deviation due to environmental forces.

Referring to FIG. 2, a vehicle 102 operating in an operating environment 150, such as a roadway, may experience external forces 120 such as crosswind or forces generated by sloped roadways which interfere with autonomous driving functionality. External forces 120 may be a byproduct of roadway camber 152, parabolic camber, composite cambers, sloped portions 154, or the like, resulting in a roadway lateral height difference 156. Lateral height difference 156 may apply undesired lateral forces on the vehicle, resulting in the vehicle shifting laterally into an actual path different than the desired path and a resultant path difference.

Figure 3:
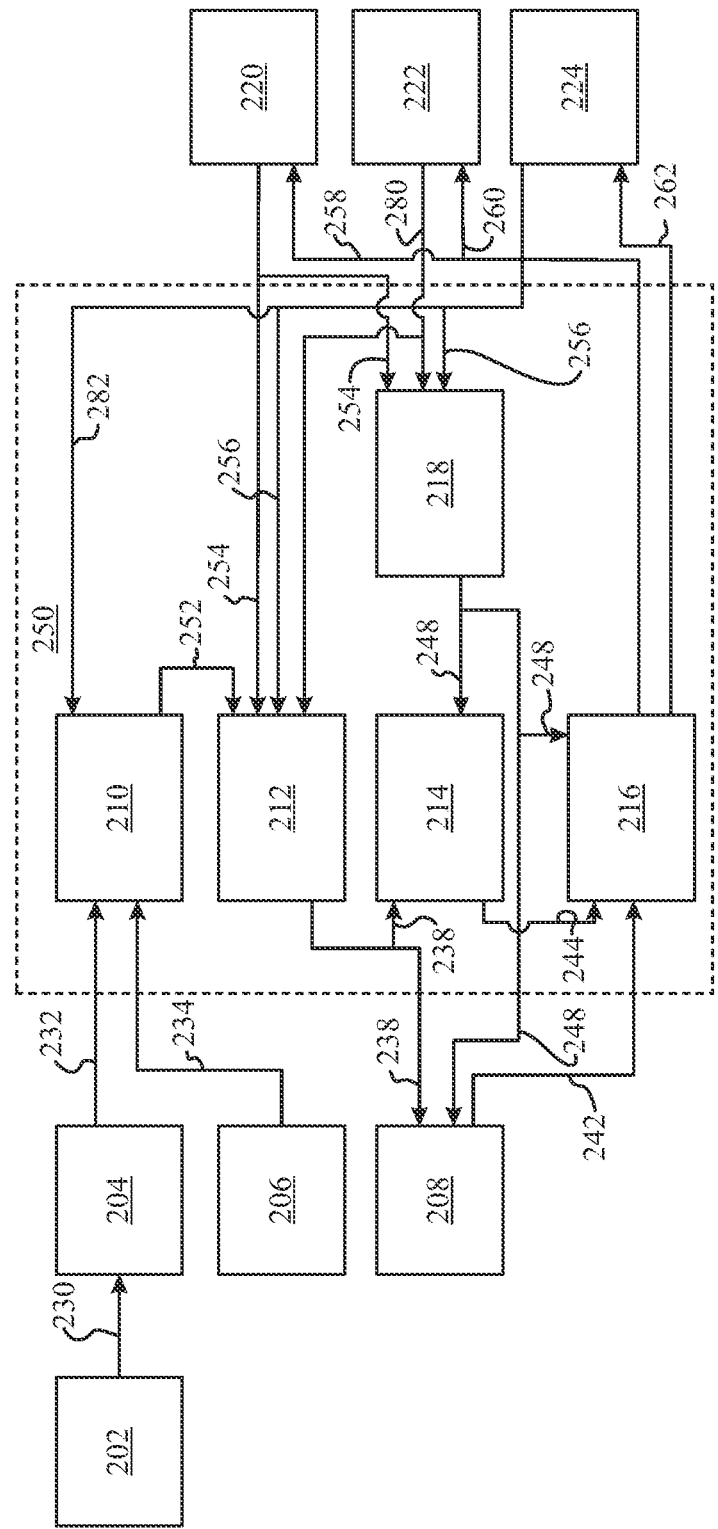
FIG. 3 depicts an illustrative variation of a block diagram of an algorithm used within a system and method of lateral compensation for path deviation due to environmental forces.

Referring to FIG. 3, a system for adapting to environmental forces in a motion control system 250 may include receiving or measuring 230 environmental forces 202 such as road geometry, crosswind, or additional lateral forces via an inertial measurement unit (IMU) 204. Dynamic vehicle measurements 232 along with vehicle corner height 234 measured by a vehicle wheel height sensor 206 may be communicated to a physics model observer 210.

The physics model observer 210 may determine measured motion data 252, such as orientation of external forces local to a vehicle, of the vehicle based on vehicle acceleration, rotation, geomagnetic, and relative vehicle corner heights from the IMU 204 and the height sensor 206. Measured motion data 252 may be communicated to a physical model deviation assessor 212.

The physical model deviation assessor 212 may determine physical model deviations 238 based on received measured motion data 252 in addition to steering actuator(s) status 254, propulsion actuator(s) status 280, and brake actuator(s) status 256. Physical model deviations 238 may be communicated to an actuation adjustment assessor 214 and the trajectory planner 208.

The actuation adjustment assessor 214 may receive actuator capability status 248 from an actuator capability manager 218 as determined based on steering actuator(s) status 254, propulsion actuator(s) status 280, and brake actuator(s) status 256. The actuation adjustment assessor 214 may receive physical model deviations 238 which exceed acceleration and rotational limits to generate an actuation adjustment recommendation 244 including offsets induced by the exceeded limits. The actuation adjustment recommendation 244 may overlay a planned trajectory, before being accepted by a motion planner. Alternatively, the actuation adjustment recommendation 244 may be an actuation adjustment command.

A motion planner 216 may receive a trajectory path 242 from a trajectory planner 208 and the actuation adjustment recommendation 244. Based upon the trajectory path 242 and the actuation adjustment recommendation 244, the motion planner 216 may determine adjusted brake actuation commands 262 based on the offsets induced by the exceeded limits and communicate adjusted brake actuation commands 262 to a brake actuation controller(s) 224; adjusted propulsion actuation commands 260 to a propulsion actuator(s) 222; and adjust steering actuation commands 258 to steering actuator(s) 220 to restore the vehicle to the desired path.

The following description of variants is only illustrative of components, elements, acts, product, and methods considered to be within the scope of the invention and are not in any way intended to limit such scope by what is specifically disclosed or not expressly set forth. The components, elements, acts, product, and methods as described herein may be combined and rearranged other than as expressly described herein and still are considered to be within the scope of the invention.

A computer readable medium may include non-transitory memory operable for machine instructions that are to be executed by a computer, the machine instructions when executed by the computer implement the following functions including determining a first set of actuation commands; determining a first set of vehicle acceleration and rotational limits corresponding to the first set of actuation commands; determining if measured vehicles dynamics at least one of reach or exceed the first set of vehicle acceleration and rotational limits; calculating at least one vehicle acceleration limit offset or at least one rotational limit offset; and determining a first set of actuation adjustments based off the at least one vehicle acceleration limit offset or at least one rotational limit offset.

Variation 2 may include a computer readable medium as in variation 1, further including modifying the first set of actuation commands with the first set of actuation adjustments to generate a second set of actuation commands.

Variation 3 may include a computer readable medium as in variation 1 or 2, further including modifying at least one of vehicle propulsion, steering, or braking actuator commands based on the second set of actuation commands.

Variation 4 may include a computer readable medium as in any of variations 1 through 3, further including actuating at least one of a vehicle propulsion, steering, or braking actuator based on the second set of actuation commands.

According to variation 5, a computer readable medium may include non-transitory memory operable for machine instructions that are to be executed by a computer, the machine instructions when executed by the computer implement the following functions including determining at least one of a vehicle propulsion, a steering actuator commands, or a braking actuator commands to achieve a desired path of travel; communicating the at least one of vehicle propulsion, steering, or braking actuator commands to a predictive model; predictively modelling vehicle behavior based on the at least one of vehicle propulsion, steering, or braking actuator commands; comparing dynamic vehicle data to at least one modelled vehicle behavior including at least one acceleration limit or rotational limit; and adjusting the vehicle propulsion commands, steering commands, or braking actuator commands to stay within the modelled vehicle behavior including at least one acceleration limit or rotational limit.

Variation 6 may include a computer readable medium as in variation 5, further including communicating at least one of adjusted vehicle propulsion, steering, or braking actuator commands to a trajectory planner.

Variation 7 may include a computer readable medium as in variation 5 or 6, further including communicating at least one of adjusted vehicle propulsion, steering, or braking actuator capacity consumed to achieve adjusted vehicle propulsion, steering, or braking actuator commands to a motion planner.

Variation 8 may include a computer readable medium as in any of variations 5 through 7 wherein adjusting the vehicle propulsion commands, steering commands, or braking actuator commands to stay within the modelled vehicle behavior including at least one acceleration limit or rotational limit occurs independently from a forward-looking sensor system identifying road limits.

Variation 9 may include a computer readable medium as in any of variations 5 through 8 wherein adjusting the vehicle propulsion commands, steering commands, or braking actuator commands to stay within the modelled vehicle behavior including at least one acceleration limit or rotational limit occurs prior to identifying road limits via a forward-looking sensor system.

Variation 10 may include a computer program product including instructions executable by an electronic processor to carry out actions, including determining a first set of actuation commands; determining a first set of vehicle acceleration and rotational limits corresponding to the first set of actuation commands; determining if measured vehicles dynamics at least one of reach or exceed the first set of vehicle acceleration and rotational limits; calculating at least one vehicle acceleration limit offset or at least one rotational limit offset; and determining a first set of actuation adjustments based off the at least one vehicle acceleration limit offset or at least one rotational limit offset.

Variation 11 may include a computer readable medium as in variation 10, further including modifying the first set of actuation commands with the first set of actuation adjustments to generate a second set of actuation commands.

Variation 12 may include a computer readable medium as in variation 10 or 11, further including modifying at least one of vehicle propulsion, steering, or braking actuator commands based on the second set of actuation commands.

Variation 13 may include a computer readable medium as in any of variations 10 through 12, further including actuating at least one of a vehicle propulsion, steering, or braking actuator based on the second set of actuation commands.

Variation 14 may include a computer readable medium as in any of variations 10 through 13, wherein determining a first set of actuation adjustments based off the at least one vehicle acceleration limit offset or at least one rotational limit offset occurs independently from a forward-looking sensor system identifying road limits.

Variation 15 may include a computer readable medium as in any of variations 10 through 12, wherein determining a first set of actuation adjustments based off the at least one vehicle acceleration limit offset or at least one rotational limit offset occurs prior to identifying road limits via a forward-looking sensor system.

The above description of select variations within the scope of the invention is merely illustrative in nature and, thus, variations or variants thereof are not to be regarded as a departure from the spirit and scope of the invention.

What is claimed is:

1. A computer readable medium comprising:
non-transitory memory operable for machine instructions that are to be executed by a computer, the machine instructions when executed by the computer implement the following functions comprising:
determining a first set of actuation commands;
determining a first set of vehicle acceleration and rotational limits corresponding to the first set of actuation commands;
receiving or measuring forces via at least one of an inertial measurement unit, and a vehicle corner height measured by a vehicle wheel height sensor;
determining measured motion data including orientation of external forces local to a vehicle based on vehicle acceleration, rotation, and geomagnetic from the inertial measurement unit, and relative vehicle corner height from the vehicle wheel height sensor;
determining physical model deviations based on the measured motion data;
determining if measured vehicles dynamics at least one of reach or exceed the first set of vehicle acceleration and rotational limits;
calculating at least one vehicle acceleration limit offset or at least one rotational limit offset based at least on the physical model deviations; and
determining a first set of actuation adjustments based off the at least one vehicle acceleration limit offset or at least one rotational limit offset.

2. A computer readable medium as in claim 1, further comprising modifying the first set of actuation commands with the first set of actuation adjustments to generate a second set of actuation commands.

3. A computer readable medium as in claim 2, further comprising modifying at least one of vehicle propulsion, steering, or braking actuator commands based on the second set of actuation commands.

4. A computer readable medium as in claim 3, further comprising actuating at least one of a vehicle propulsion, steering, or braking actuator based on the second set of actuation commands.

5. A computer readable medium comprising:
non-transitory memory operable for machine instructions that are to be executed by a computer, the machine instructions when executed by the computer implement the following functions comprising:
determining at least one of a vehicle propulsion command, a steering actuator command, or a braking actuator command to achieve a desired path of travel;
communicating the at least one of vehicle propulsion, steering, or braking actuator commands to a predictive model;
predictively modeling vehicle behavior based on the at least one of vehicle propulsion, steering, or braking actuator commands;
receiving or measuring forces via at least one of an inertial measurement unit, and a vehicle corner height measured by a vehicle wheel height sensor;
determining measured motion data including orientation of external forces local to a vehicle based on vehicle acceleration, rotation, and geomagnetic from the inertial measurement unit, and relative vehicle corner height from the vehicle wheel height sensor;
determining physical model deviations based on the measured motion data;
comparing dynamic vehicle data to at least one modeled vehicle behavior comprising at least one acceleration limit or rotational limit; and
adjusting the vehicle propulsion commands, steering commands, or braking actuator commands to stay within the modeled vehicle behavior comprising at least one acceleration limit or rotational limit based at least on the physical model deviations.

6. A computer readable medium as in claim 5, further comprising communicating at least one of adjusted vehicle propulsion, steering, or braking actuator commands to a trajectory planner.

7. A computer readable medium as in claim 5, further comprising communicating at least one of adjusted vehicle propulsion, steering, or braking actuator capacity consumed to achieve adjusted vehicle propulsion, steering, or braking actuator commands to a motion planner.

8. A computer readable medium as in claim 5, wherein: adjusting the vehicle propulsion commands, steering commands, or braking actuator commands to stay within the modeled vehicle behavior comprising at least one acceleration limit or rotational limit occurs independently from a forward-looking sensor system identifying road limits.

9. A computer readable medium as in claim 8, wherein: adjusting the vehicle propulsion commands, steering commands, or braking actuator commands to stay within the modeled vehicle behavior comprising at least one acceleration limit or rotational limit occurs prior to identifying road limits via a forward-looking sensor system.

10. A computer readable medium comprising instructions executable by an electronic processor to carry out actions, comprising:
determining a first set of actuation commands;
determining a first set of vehicle acceleration and rotational limits corresponding to the first set of actuation commands;
receiving or measuring forces via at least one of an inertial measurement unit, and a vehicle corner height measured by a vehicle wheel height sensor;
determining measured motion data including orientation of external forces local to a vehicle based on vehicle acceleration, rotation, and geomagnetic from the inertial measurement unit, and relative vehicle corner height from the height sensor;
determining physical model deviations based on the measured motion data;
determining if measured vehicles dynamics at least one of reach or exceed the first set of vehicle acceleration and rotational limits;
calculating at least one vehicle acceleration limit offset or at least one rotational limit offset based at least on the physical model deviations; and
determining a first set of actuation adjustments based off the at least one vehicle acceleration limit offset or at least one rotational limit offset.

11. A computer readable medium as in claim 10, further comprising modifying the first set of actuation commands with the first set of actuation adjustments to generate a second set of actuation commands.

12. A computer readable medium as in claim 11, further comprising modifying at least one of vehicle propulsion, steering, or braking actuator commands based on the second set of actuation commands.

13. A computer readable medium as in claim 12, further comprising actuating at least one of a vehicle propulsion, steering, or braking actuator based on the second set of actuation commands.

14. A computer readable medium as in claim 10, wherein: determining a first set of actuation adjustments based off the at least one vehicle acceleration limit offset or at least one rotational limit offset occurs independently from a forward-looking sensor system identifying road limits.

15. A computer readable medium as in claim 14, wherein: determining a first set of actuation adjustments based off the at least one vehicle acceleration limit offset or at least one rotational limit offset occurs prior to identifying road limits via a forward-looking sensor system.

* * * * *